Feb. 2, 1960  O. G. SCHWEDE  2,923,129
ENGINE FUEL FLOW REGULATOR FOR REGULATING ENGINE FUEL FLOW
Filed May 8, 1953  2 Sheets-Sheet 1

*INVENTOR.*
OTTO G. SCHWEDE
*ATTORNEYS*

Feb. 2, 1960  O. G. SCHWEDE  2,923,129
ENGINE FUEL FLOW REGULATOR FOR REGULATING ENGINE FUEL FLOW
Filed May 8, 1953  2 Sheets-Sheet 2

INVENTOR.
OTTO G. SCHWEDE
BY
ATTORNEYS

United States Patent Office 2,923,129
Patented Feb. 2, 1960

2,923,129

ENGINE FUEL FLOW REGULATOR FOR REGULATING ENGINE FUEL FLOW

Otto G. Schwede, Ventura, Calif.

Application May 8, 1953, Serial No. 353,923

1 Claim. (Cl. 60—39.28)

(Granted under Title 35, U.S. Code (1952), sec. 266)

The invention described herein may be manufactured and used by or for the Government of the United States of America for governmental purposes with the payment of any royalties thereon or therefor.

This invention relates to a device for the regulation of fuel flow to a motor, and is particularly directed to apparatus for regulating fuel flow to a jet engine.

It is well known to control the amount of fuel fed to an engine or combustion chamber by means of a device responsive to changes in pressure developed by the engine, as illustrated in U.S. Patents 1,236,793; 2,427,758; and 2,499,232. In systems of this type, the engine or combustion chamber is preset to operate at a certain pressure, and the fuel supply is simply increased or decreased in accordance with the pressure generated by fuel combustion, to maintain operation substantially at the preset operating pressure. While such systems are satisfactory in many applications, in certain instances the particular problems involved cannot be solved by employing fuel regulating devices of the foregoing type. This is the case, for example, in jet engines or motors used to power aircraft or missiles.

Figure 1:
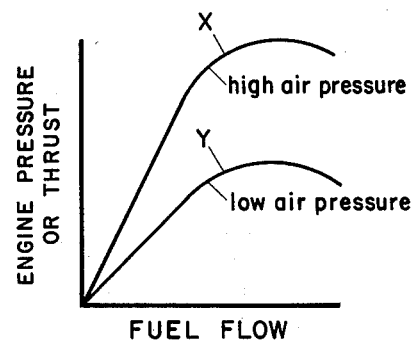

The thrust of a jet motor, e.g. a pulse jet, depends on such parameters as fuel pressure and air pressure. Although fuel pressure can be controlled by valves, the air pressure depends on the speed of the aircraft or missile powered by the jet, and the density of the air, i.e., altitude of the craft. Therefore, the diagrams showing the relation between the thrust of the aircraft and its rate of fuel flow constitute a set of different curves of similar shape but varying with air pressure as indicated in Fig. 1, wherein one set of curves, represented by curve X, is obtained at high air pressure while another set of curves, represented by curve Y, is obtained at low air pressure. Because of the effect of missile velocity and altitude, it is impossible to preset the fuel pressure to a single optimum valve for all flight conditions. To meet the variations in flight conditions the fuel flow has in the past been controlled by meters measuring the altitude and the relative velocity of the missile. These controls, however, have not operated with sufficient reliability, resulting in a poor thrust efficiency of the motor.

While efforts have been made to avoid controls which respond directly to aircraft velocity and altitude, and to derive the control function from the actual performance of the motor, to date all of these efforts have apparently proved unsuccessful.

Figure 2A:
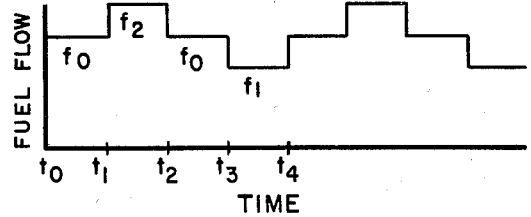
Figure 2:
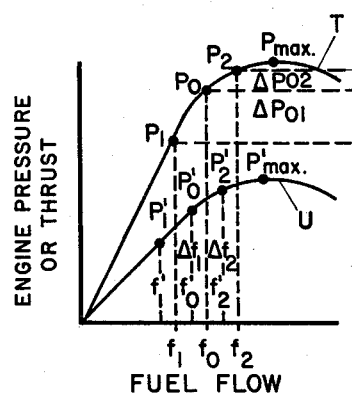
Figure 2B:
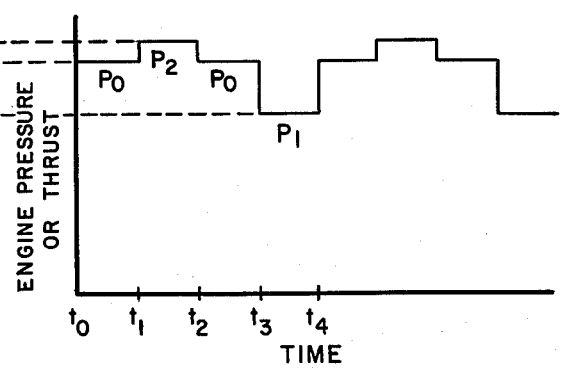
Figure 3:
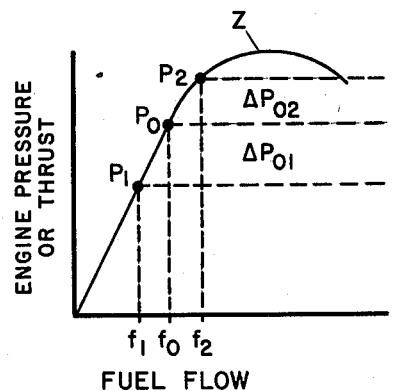
Figure 4:
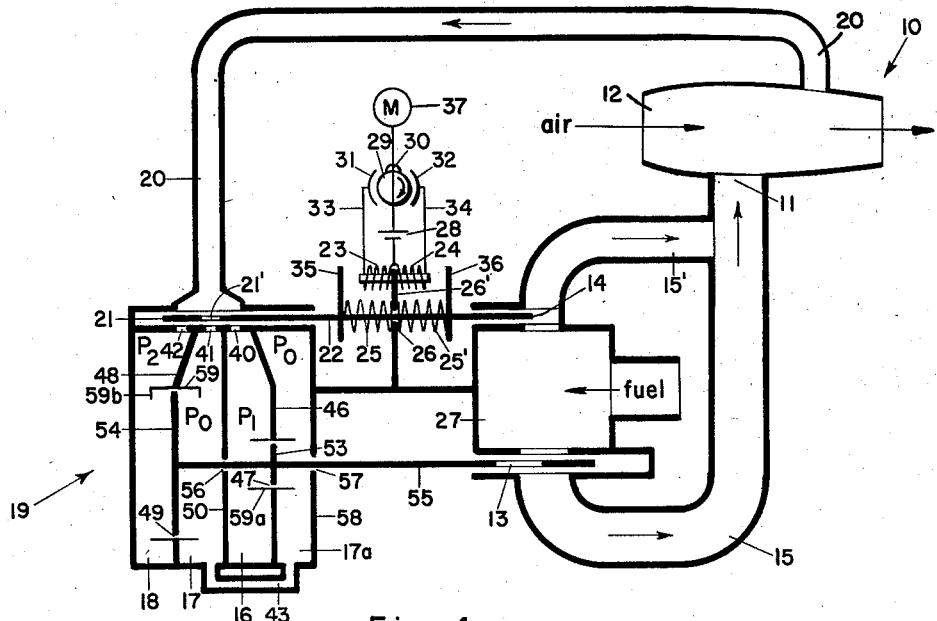
Figure 5:
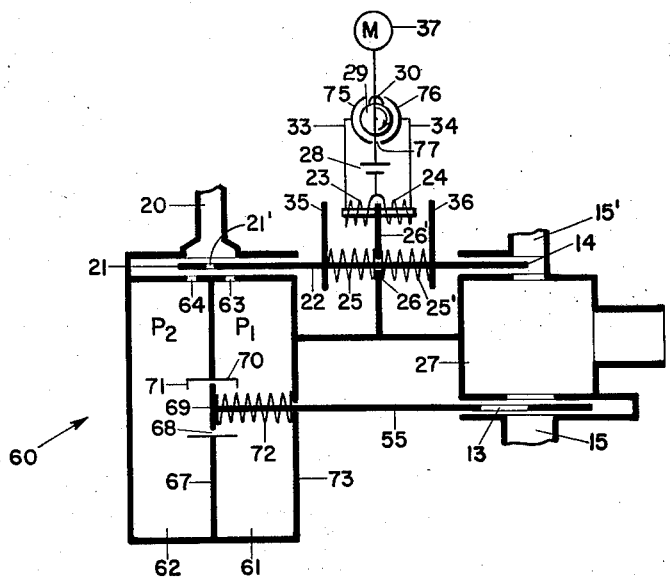

One object of the invention is the regulation of fuel flow to an engine or motor;

Another object is to control fuel flow to a motor in accordance with variations in the performance of the motor;

Another object is to provide an apparatus for regulating fuel flow to a motor taking into account variations in motor pressure brought about by changing environmental conditions;

A particular object is the provision of an apparatus for regulating fuel flow to a jet engine or motor, especially of the pulse jet type, used to power an aircraft or missile, taking into account variations in motor pressure due to changes in velocity and altitude of such craft;

Another object is to afford an apparatus for controlling the rate of fuel flow to a jet motor wherein the control function is derived from the actual performance of the motor, thus taking into account variations in speed and altitude of the craft;

A further aim of the invention is to provide a fuel flow regulator for a jet engine for regulating flow of fuel thereto, wherein the engine pressure or thrust controlling fuel regulation is made to fluctuate in the neighborhood of an optimum value;

Yet another object of the invention is the provision of a fuel regulating device for a jet engine wherein the average fuel flow is periodically changed in response to variations of engine pressure and thrust, to obtain a predetermined nonlinear response;

Other objects and many of the attendant advantages of this invention will be readily appreciated as the same becomes better understood by reference to the following detailed description when considered in connection with the accompanying drawings wherein:

Figs. 1, 2 and 3 are graphs showing curves representing fuel flow as a function of engine pressure or thrust, Fig. 2 illustrating preferred operation in accordance with the invention, Figs. 2a and 2b are diagrams based on curve T of Fig. 2, Fig. 4 is a schematic illustration of fuel regulating apparatus according to the invention, and Fig. 5 is a schematic illustration of certain modifications of the apparatus of Fig. 4.

The fuel flow regulating device or apparatus of the invention includes means for maintaining a preselected fuel flow, generally in the form of a main valve located between the fuel supply and the engine, and means for periodically varying such flow a predetermined amount. The latter means, in the nature of an auxiliary valve, periodically and continuously varies the rate of fuel flow above and below the optimum average flow for the particular conditions under which the motor is operating. A means is also provided for detecting variations in engine performance in response to variations in fuel flow. Such means is connected to the engine or motor and detects variations in engine pressure, which are proportional to variations in thrust thereof, in response to varying fuel flow, and correlates such variations in engine pressure or thrust with the fuel flow variations. Further, means is included for controlling the above first mentioned means or main fuel valve in accordance with the engine performance variations. The latter means operates in response to the above engine pressure or thrust detecting means to control or adjust the main fuel valve in the direction of optimum fuel flow for the particular conditions of operation of the engine.

The present invention avoids controls for fuel flow to a jet engine which depend on the direct measurement of velocity and altitude of the craft powered thereby, enabling the control function to be derived from the actual performance of the engine.

The basic principles of the invention will be explained briefly with reference particularly to curves T and Z in Figs. 2 and 3, respectively, of the drawings, wherein fuel flow is again plotted as a function of engine pressure or thrust, as in the case of Fig. 1, curves T and Z representing operating conditions at the same air pressure.

The fuel flow $f$ is varied periodically by a small but essentially constant flow difference $\Delta f$ from the average flow $f_0$ to a lower flow $f_1$ or a higher flow $f_2$, resulting in a periodically varying engine pressure or thrust.

For given flight conditions, i.e., a given fuel-thrust diagram, the resulting differences in engine pressure or thrust $\Delta P_{01}=P_0-P_1$ and $\Delta P_{02}=P_2-P_0$, depend on the chosen average fuel flow $f_0$. If the average fuel flow $f_0$ is comparatively low as in Fig. 3, both thrust differences are noted to be of almost equal amplitude. If the average fuel flow $f_0$ is relatively high as shown with reference to curve T of Fig. 2, the corresponding thrust difference $\Delta P_{02}$ is smaller than $\Delta P_{01}$.

An optimum and safe performance of the motor is obtained when the average engine pressure or thrust $P_0$ is a certain percentage less than the maximum thrust $P_{max}$, e.g., $P_{opt}=80\% \ P_{max}$. At this point, referring to Fig. 2, a certain fuel flow variation $\Delta f_1$ produces a difference in thrust $\Delta P_{01}$ which is about $3\Delta P_{02}$. When this ratio is obtained the main valve which contributes to control of the average fuel flow is in its correct position. If the thrust ratio $$\frac{\Delta P_{01}}{\Delta P_{02}} \pm 3$$

the main valve will open or close, in accordance with the invention, until the ratio 3 is obtained. For example, too low an average fuel flow $f_0$ such that $P_0 < P_{opt}$ results in a thrust ratio $$\frac{\Delta P_{01}}{\Delta P_{02}} < 3$$

In this case the main valve is opened wider, resulting in an increasing ratio $$\frac{\Delta P_{01}}{\Delta P_{02}}$$

As the ratio approaches the value 3, the movement of the main valve slows down and stops when $$\frac{\Delta P_{01}}{\Delta P_{02}} = 3$$

If the average fuel flow is too high so that $P_0 > P_{opt}$ the result will be a thrust ratio $$\frac{\Delta P_{01}}{\Delta P_{02}} > 3$$

Under these circumstances the main valve opening is reduced in size resulting in a decreasing ratio $$\frac{\Delta P_{01}}{\Delta P_{02}}$$

Again, as this ratio approaches the value 3 the movement of the main valve slows down and stops when $$\frac{\Delta P_{01}}{\Delta P_{02}} = 3$$

Equilibrium will be reached in both cases at a fuel flow where $P_0 = P_{opt} = 80\% \ P_{max}$.

It is therefore seen that according to the preferred embodiment, practice of the invention is carried out correspondingly to conditions along the upper nonlinear portion of the fuel flow-engine pressure (or thrust) curves, as illustrated by points $P_0$, $P_1$ and $P_2$ on curve T of Fig. 2, rather than along the lower portion of such curves, as represented by the corresponding points on curve Z of Fig. 3.

A device or apparatus embodying the above described principles is shown in Fig. 4. In this figure, a jet motor 10 receives fuel through inlet 11 from fuel supply chamber 27, and air through inlet 12. The quantity of fuel fed to the motor is controlled by the main valve 13 and the auxiliary valve 14, in the fuel supply chamber. The main valve communicates with inlet 11 through a pipe or conduit 15, and the auxiliary valve communicates with pipe 15 by a conduit 15'. The thrust or chamber pressure of the motor is applied to a number of interior control chambers 16, 17, 17a, and 18 of a housing 19 by means of a conduit 20 and a distributor 21 mounted on one end of a shaft 22 and having a port 21', auxiliary valve 14 being mounted on the opposite end of said shaft.

The distributor and auxiliary valve 14 are simultaneously controlled by two solenoids 23 and 24 and a double spring 25, 25' positioned about shaft 22 between shaft bearing 26 and two oppositely disposed armatures 35 and 36 mounted on shaft 22. The spring establishes zero position of the shaft, as hereinafter more fully described, and is operably associated with the solenoids by a stationary member 26'. The solenoids are energized by a circuit including a battery 28, one terminal of which is connected to a terminal of each of the solenoids, a rotatable member 29 electrically connected to the other terminal of the battery and having a contact member 30 on its periphery, a pair of stationary brushes 31 and 32 adapted to be engaged by contact member 30, and a pair of electrical leads 33 and 34 connecting the brushes to the other terminal of each of solenoids 23 and 24, respectively. Member 29 is rotated generally at a constant speed by any suitable means such as an electric motor 37. Lateral movement of distributor 21 by its shaft 22 to the left or right on alternate energization of solenoid 23 or 24 is limited by armatures 35 and 36, and such movement tends to open or close auxiliary valve 14.

Chambers 16, 17 and 18 of housing 19 each have ports 40, 41 and 42, respectively, adapted to be aligned with port 21' of distributor 21, and chamber 17 communicates with chamber 17a through a bypass 43. Chambers 16 and 17a are separated by a wall 46 having an aperture 47 therein, chambers 17 and 18 are separated by a wall 48 having an aperture 49 therein, and chambers 16 and 17 are separated by a wall 50, the area of aperture 49 being greater than that of aperture 47. Movable pistons or walls 53 and 54 are positioned to fit snugly within apertures 47 and 49, respectively. These pistons, as well as the apertures, are of circular shape and are mounted for lateral movement on a shaft 55 connected to main valve 13, the shaft having a tight slidable fit through an aperture 56 of wall 50 and an aperture 57 of housing wall 58, so as to prevent leakage between chambers 16 and 17 and between chamber 17a and the atmosphere. Movement of pistons 53 and 54, and of shaft 55 to the left or right tends to close or open the main valve 13. Cylinders 59 and 59a are positioned in walls 48 and 46, respectively, adjacent the edges of apertures 49 and 47, in a direction normal to said walls. Members 59 and 59a function as guides during movement of pistons 54 and 53, respectively, the pistons being in tight slidable engagement with the cylinders, thus preventing communication between chambers 17 and 18, and between chambers 16 and 17a during lateral movement of the pistons along their respective cylinders. Stop members 59b are located at opposite ends of a side wall of cylinder 59 to avoid movement of piston 54 as well as piston 53, out of engagement with their respective cylinders. The auxiliary valve 14 is located in relation to the alignment position of port 21' of distributor 21 with ports 40, 41 and 42 of control chambers 16, 17 and 18, respectively, so that the pressure transmitted to chambers 17 and 17a corresponds to the thrust $P_0$ in Fig. 2, and the engine pressures transmitted to chambers 16 and 18 correspond to the trust $P_1$ and $P_2$, respectively, in Fig. 2, as will be apparent hereinafter.

The effective areas of the two movable pistons 53 and 54 which separate the above noted control chambers have the ratio of 1:3. Therefore, the pressure difference between chambers 16 and 17a must be more than three times the difference in pressure between chambers 17 and 18 in order to cause movement of shaft 55 of the main valve 13 to a position where it reduces the fuel flow, i.e. to the left as viewed in Fig. 4. On the other hand, for a pressure difference between chambers 16 and 17a less than three times the pressure difference between chambers 17 and 18, shaft 55 yields to the pressure in chamber 18, moving the main valve to the right and resulting in an increased fuel flow. When $P_0-P_1=3$ $(P_2-P_0)$ there is no movement of shaft 55 and main valve 13, and the fuel flow therethrough remains constant.

The fuel regulator mechanism described above operates as follows:

The motor which actuates rotatable member 29 is first set into operation. At a time to the auxiliary valve 14 is in its half open position as seen in Fig. 4, resulting in a definite fuel flow $f_0$ and engine pressure or output thrust $P_0$ (see Figs. 2, 2a and 2b). Under these circumstances port 21' of distributor 21 is in communication with port 41 of control chamber 17, and the chamber pressure $P_0$ of the motor is transmitted to the latter chamber and control chamber 17a through bypass 43. After $t_1$ seconds member 29 will have rotated from its position shown in Fig. 4 clockwise to a position wherein the contact member 30 thereof engages brush 32. Solenoid 24 is thus energized urging shaft 22 to the left and auxiliary valve 14 into its fully open position, while shifting port 21' of distributor 21 into alignment with port 42 of control chamber 18. The fuel flow is accordingly increased, resulting in a higher engine pressure $P_2$ which is applied to control chamber 18. Since control chamber 17 is closed off by distributor 21 and is not in communication with conduit 20 during this period, the pressure in chambers 17 and 17a does not change during this part of the cycle.

At the time $t_2$ contact member 30 of rotatable member 29 moves out of engagement with brush 32 to its lower position between brushes 31 and 32. In this interval solenoid 24 is deenergized and spring 25' urges shaft 22 to the right, back to its original starting position illustrated in Fig. 4, wherein auxiliary valve 14 is half open and port 21' of distributor 21 permits transmission of engine pressure to chambers 17 and 17a. This results in decreased fuel flow and lowering of the engine pressure again to $P_0$ which is transmitted to chambers 17 and 17a. Control chamber 18 is closed during this period so that the pressure therein remains at $P_2$. The last part of the cycle begins at $t_3$ when member 29 rotates to a position such that contact member 30 engages brush 31. At this time solenoid 23 becomes energized urging shaft 22 to the right, completely closing auxiliary valve 14 and bringing port 21' of distributor 21 into alignment with port 40 of control chamber 16 and closing off chambers 17 and 17a, as well as chamber 18. The fuel flow is thus decreased and consequently the motor pressure is decreased further to pressure $P_1$ which is transmitted to chamber 16. Therefore, control chamber 16 will have the lowest pressure of all the control chambers. At time $t_4$ contact member 30 becomes disengaged from brush 31 and reaches its initial upper position between brushes 31 and 32, shown in Fig. 4, at which time solenoid 23 is deenergized, causing spring 25 to urge shaft 22 to the left into its initial starting position with auxiliary valve 14 half open and port 21' of distributor 21 in alignment with port 41 of chamber 17. The cycle is then repeated as member 29 continues to rotate.

It is seen that the pressure difference between control chambers 17a and 16 counteracts the pressure difference between control chamber 18 and 17. If the ratio of these two differences remains at the correct value of 3 during the above described cycle of movements of auxiliary valve 14, there will be no movement of shaft 55 of the main valve 13, and hence the main valve will remain stationary in its partly open position as shown in Fig. 4. However, if during the foregoing cycle of movements of auxiliary valve 14 the pressure difference between control chambers 17a and 16 becomes higher than it should be so that the above ratio exceeds 3, indicating an average fuel flow and engine pressure $P_0$ which is too high along curve T of Fig. 2, the force on piston 53 overcomes the counterforce of piston 54, urging shaft 55 to the left and further restricting the opening of main valve 13.

This restricting movement continues until, by decreasing fuel flow sufficiently, the operating point $P_0$ has moved far enough down along curve T to have reached the correct value $P_0=P_{opt}$, where the above ratio is again 3 and the force exerted by piston 53 on shaft 55 is just balanced by the oppositely exerted force of piston 54. At this point the movement of shaft 55 ceases until a new change in conditions occurs, such as a change in altitude or speed of the craft powered by the jet engine, which is detected in the form of a change in engine pressure in the control chambers of housing 19 during the cycle of operation of auxiliary valve 14, requiring a change in the main fuel supply and initiating a new control cycle for main valve 13.

If the pressure difference between control chambers 17a and 16 becomes lower than it should be so that the foregoing ratio is less than 3, indicating an average fuel flow and engine pressure $P_0$ which is too low along curve T of Fig. 2, the force on piston 54 exceeds the opposing force on piston 53, urging shaft 55 to the right and enlarging the opening of main valve 13. This enlarging movement continues until fuel flow has increased sufficiently so that $P_0$ has again reached its optimum value, at the point where the foregoing ratio approaches 3, and the opposing forces exerted on pistons 53 and 54 are just balanced.

It is apparent that the cycle of movements of auxiliary valve 14, which is actuated by solenoids 23 and 24, periodically and continuously superimposes an additional fuel flow upon the fuel flow permitted by main valve 13. The average fuel flow $f_0$ corresponding to the average motor pressure or thrust $P_0$ noted on curve T of Fig. 2, is the fuel flow through main valve 13 which has added thereto the fuel flow through auxiliary valve 14 when the latter is in its normal half open position shown in Fig. 4. By periodically further opening and then closing the auxiliary valve according to the invention, to thus increase or decrease the average rate of fuel flow to obtain an engine pressure or thrust varying along curve T of Fig. 2 above and below the average pressure $P_0$, to $P_2$ and $P_1$, respectively, fluctuations in the optimum average pressure such that $P_0-P_1$ is no longer equal to $3(P_2-P_0)$ may be detected in the control chambers of housing 19, and the proper correction made in the position of main valve 13 through the movement of shaft 55, in accordance with the unbalanced forces on diaphragms 53 and 54, to attain the optimum pressure indicated when $P_0-P_1 = 3(P_2-P_0)$. The period required by the auxiliary valve to pass through one cycle of movement thereof may vary; thus for example, this valve may complete from 1 to 50 cycles per second.

Should an external condition affecting the performance of the motor be changed from that previously encountered, such as a change in altitude of the craft powered by a jet engine according to the invention, thus requiring a change in fuel flow to maintain optimum engine pressure, the invention device automatically adjusts itself to this change. Referring to Fig. 2, it is assumed that the curve U represents the new function of fuel flow versus engine pressure or thrust due to a lower air pressure on the craft as a result of an increase in flight altitude. It is seen that the rate of fuel flow $f_0'$ now required to obtain the new optimum engine pressure $P_0=80\% \ P'_{max}$ along this curve has changed (decreased) from that required to obtain the optimum pressure $P_0$ along curve T. However, in accordance with the aforedescribed structure of the invention device, the new lower optimum operating pressure $P_0'$ will again be established along curve U where $P_0'-P_1'$ is substantially equal to $3(P_2'-P_0')$. It is apparent that the new rates of fuel flow $f_2'$ and $f_1'$, corresponding to the new lower limiting values of fluctuating engine pressure $P_2'$ and $P_1'$, respectively, along curve U, have also changed (decreased) from their corresponding values $f_2$ and $f_1$ along curve T.

The new operating conditions are established by a change in the position of the main valve 13 to a point where the fuel flow allowed to pass this valve when added to that conducted through auxiliary valve 14 results in the new optimum engine pressure $P_0'$ on courve U, as compared to the corresponding position of the main valve under the conditions required to attain the optimum pressure $P_0$ on curve T. In other words, the new average fuel flow $f_0'$ corresponds to a position of main valve 13 farther to the left (that is where it has a smaller opening) as compared to its position shown in Fig. 4 corresponding to $f_0$ on curve T.

In Fig. 5 is shown a modification of the invention device. Here, housing 60 is provided with only two control chambers 61 and 62 having ports 63 and 64, respectively, for periodic communication with port 21' of distributor 21. Chambers 61 and 62 are separated by a wall 67 having an aperture 68 which accommodates a piston 69 fitting snugly therein, the diaphragm being mounted at one end of shaft 55 which has positioned at its opposite end main valve 13. About the outer edge of aperture 68 and connected to wall 67 is positioned normal thereto a cylinder 70 similar to guide member 59 of Fig. 4 and having stops 71 at the opposite ends thereof, for limiting the extent of travel of piston 69 in either direction. A compression spring 72 is positioned around shaft 55 between piston 69 and wall 73 of the housing, the spring applying a constant force against the piston. In this modification, only engine pressures $P_1$ and $P_2$ are transmitted to chambers 61 and 62, respectively, of the housing, the reference or optimum pressure $P_0$ being supplied by the constant force exerted by spring 72. It is apparent that according to this embodiment, the number of individual movements per cycle of distributor 21 and auxiliary value 14 connected thereto is reduced from four, in the device of Fig. 4, essentially to two, and hence contact members 75 and 76 in the solenoid circuit of the instant embodiment are substantially semi-circular in shape with only a small space 77 separating the adjacent ends of such members and representing the small interval of time required for deenergizing one solenoid and energizing the other during movement of port 21' of the distributor from port 63 to port 64, and vice versa.

The mode of operation of the device modified according to Fig. 5 is different from the ratio control device of Fig. 4 in that the former operates on the basis of an absolute difference control. Thus, in the fuel regulator device of Fig. 5, zero setting is established when the difference $P_2-P_1$ has reached a fixed value determined by the force of spring 72. A difference smaller than the fixed value tends to close the main valve 13, i.e. forces piston 69 to the left, and a pressure difference greater than the fixed value urges this piston to the right, thus opening the main valve.

It is understood that the structure of the invention device may be modified, if desired, to maintain an optimum pressure $P_0$ different from 80% $P_{max}$ and employing a ratio of $\Delta P_{01}:\Delta P_{02}$ or of $(P_0-P_1):(P_2-P_0)$ having a value other than 3, for example 2 or 4. This change can be accomplished, for example, by varying the ratio of the areas of pistons 53 and 54 of the device of Fig. 4 accordingly, or by changing the constant force exerted by spring 72 in the device of Fig. 5. Further, conduit 15' from auxiliary valve 14 can be positioned completely in parallel with main conduit 15 and have a separate inlet into the motor adjacent to that of inlet 11 of the main conduit, and if desired, the auxiliary valve can be located in a position different from that shown in the drawings. Moreover, mechanical components of the apparatus of Figs. 4 and 5 can be replaced by electrical or electronic components having corresponding functions. Thus, for example electrical pickups can be used for detecting pressures transmitted from the engine during the cycle of movements of auxiliary valve 14, and electronic means employed for comparison of such pressures and control of main valve 13 in response thereto.

From the foregoing, it is apparent the invention affords a fuel regulating device and method for fuel regulation which are applicable to motors encountering varying fuel requirements making it impossible to preset the operating pressure at a specific value and maintain it indefinitely at this value, the invention being particularly adapted for jet aircraft engines. Moreover, the invention mechanism is sturdy, reliable in operation and can be easily constructed from inexpensive, readily available materials.

Obviously many modifications and variations of the present invention are possible in the light of the above teachings. It is therefore to be understood that within the scope of the appended claims the invention may be practiced otherwise than as specifically described.

I claim:

Fuel regulating apparatus for a jet motor comprising in combination a pulse jet motor, a multi-walled housing containing two pairs of chambers, the first of said two pairs of chambers being separated by a first movable wall and the second of said two pairs of chambers being separated by a second movable wall, the area of said first movable wall being two to four times the area of said second movable wall, conduit means connected between said motor and said housing to apply motor pressure to said chambers, a three-position distributor valve in said conduit means effective to simultaneously apply motor pressure to one chamber of each of said pairs when in one of its positions, and to supply motor pressure to one chamber of only one of said pairs when in each of its other two positions, a main fuel conduit connected to said motor to feed fuel thereto, a main fuel valve in said main fuel conduit connected to said movable walls to be positioned thereby in accordance with the relative motor pressure between the two chambers of each pair as determined by the position of said distributor valve, an auxiliary fuel conduit connected to feed fuel to said motor, an auxiliary fuel valve in said auxiliary fuel conduit, and means connected to said distributor valve and said auxiliary fuel valve effective to simultaneously actuate said valve to maintain a desired average optimum fuel flow, the position of said main fuel valve remaining unchanged as long as the pressure difference between the two chambers of said second pair has the same ratio with respect to the pressure difference between the two chambers of said first pair as the ratio between the area of said first movable wall with respect to the area of said second movable wall.

References Cited in the file of this patent
UNITED STATES PATENTS

| | | |
|---|---|---|
| 2,545,815 | Klinge | Mar. 20. 1951 |
| 2,650,471 | Knudsen | Sept. 1, 1953 |
| 2,750,741 | Leeper | June 19, 1956 |

UNITED STATES PATENT OFFICE

CERTIFICATE OF CORRECTION

Patent No. 2,923,129                              February 2, 1960

Otto G. Schwede

It is hereby certified that error appears in the printed specification of the above numbered patent requiring correction and that the said Letters Patent should read as corrected below.

Column 1, line 17, for "with" read -- without --; column 4, line 61, for "trust" read -- thrust --; column 5, line 8, for "to" read -- $t_o$ --.

Signed and sealed this 31st day of January 1961.

(SEAL)
Attest:

KARL H. AXLINE                              ROBERT C. WATSON
Attesting Officer                            Commissioner of Patents